United States Patent [19]

Yu et al.

[11] Patent Number: 5,670,055
[45] Date of Patent: Sep. 23, 1997

[54] USE OF THE LINEAR ALKYLBENZENE SULFONATE AS A BIOFOULING CONTROL AGENT

[75] Inventors: F. Philip Yu, Aurora; William F. McCoy, Naperville, both of Ill.

[73] Assignee: Nalco Chemical Company, Naperville, Ill.

[21] Appl. No.: 694,012

[22] Filed: Aug. 8, 1996

[51] Int. Cl.⁶ ............................................. C02F 1/50
[52] U.S. Cl. ........................ 210/698; 210/699; 210/701; 210/755; 210/764; 252/180; 422/15; 422/16
[58] Field of Search ............................ 210/698–701, 210/764, 755; 252/180; 422/16–18, 15

[56] References Cited

U.S. PATENT DOCUMENTS

| | | | |
|---|---|---|---|
| 4,589,985 | 5/1986 | Yorke | 210/699 |
| 4,895,664 | 1/1990 | Chen | 210/701 |
| 4,976,874 | 12/1990 | Gannon et al. | 210/764 |
| 5,034,155 | 7/1991 | Soeder et al. | 252/180 |
| 5,073,292 | 12/1991 | Hessel et al. | 252/174.12 |
| 5,284,590 | 2/1994 | Kohlhofer et al. | 210/764 |
| 5,348,678 | 9/1994 | Hodam et al. | 252/106 |
| 5,512,186 | 4/1996 | Wright et al. | 210/764 |

*Primary Examiner*—Peter A. Hruskoci
*Attorney, Agent, or Firm*—Robert A. Miller; James J. Drake

[57] ABSTRACT

The invention comprises a method for dispersing biofilms caused by the growth of slime-forming bacteria and other microorganisms in industrial process water. The method comprises adding an effective biofilm dispersing amount of a linear alkylbenzene sulfonate to the industrial process water which contains slime-forming bacteria and other microorganisms. In addition, an alternative embodiment of the invention comprises adding a compound selected from the group consisting of peracetic acid, glutaraldehyde, isothiazolone, methylene bisthiocyanate, thiocyanomethylthio benzothiazole, 2-bromo-2-nitro-1,3-propane diol, dibromonitrilopropane diol, tetralcishydroxy methyl phosphonium sulfate, decylthioethane amine, alkyl dimethyl benzyl ammonium chloride and combinations thereof.

9 Claims, No Drawings

USE OF THE LINEAR ALKYLBENZENE SULFONATE AS A BIOFOULING CONTROL AGENT

BACKGROUND OF THE INVENTION

1. Field of the Invention

This invention relates generally to the field of water treatment technologies and, more particularly to methods for removing attached microorganisms, also known as biofilms, from a surface submerged in water.

2. Description of the Prior Art

Biofouling has always been problematic in industrial water systems, such as cooling towers, heat exchanger and airwashers. The presence of microorganisms in industrial water cannot be totally eliminated even with excessive use of chemical biocides. Formation of bacteria biofilms can adversely affect heat transfer efficiency and fluid friction resistance. In addition, biofouling also plays an important role in microbiologically influenced corrosion.

The most common means to control biofouling is using chemicals such as chlorine, bromine, isothiazolone, glutaraldehyde and other biocides. These chemical biocides serve to kill the planktonic and attached microorganisms. However, it appears that biocides have difficulty penetrating the extracellular polymeric material in biofilms and removing them from the surface. Excessive dosage of biocide might be able to control the biofouling; however, its presence in the effluent is environmentally unacceptable.

Mechanical treatments, including scrapers, sponge balls or "pigs", are commonly used to remove biofilms. Acids, chelants and dispersants are likewise considered to be effective to cause detachment of deposit materials. Sidestream filtration devices, which continuously process 1–5% system water, have also drawn increasing interest. Nevertheless, these approaches are either labor intensive or expensive.

Recently, the application of dispersants has become popular as a means of enhancing biocide efficacy. Dispersants in the market comprise mainly block copolymers or terpolymers, having high molecular weights ranging from 1,000 to 15,000,000 daltons. They attract fine foulant particles onto polymeric chains, and form fluffy particles that are more readily detached from the fouled surfaces. It is believed that these surface active compounds functioning as biodispersants can increase the diffusion of biocide into the biofilm and cause the detachment of biofilm. As a result, greater biofouling control can be achieved by the combination of biodispersant and biocide.

To date, biodispersants have not been used effectively without biocides. As environmental regulations on biocide usage becomes more stringent, it is desirable to create a high performance biodispersant to control biofouling without the addition of chemical biocides.

Japanese Patent No. 07224299 describes the use of linear alkylbenzene sulfonate (LAS) in formulations of detergents for removal of hardened oils from hard surfaces, but it is not related to biofilm study. Another prior an of interest is European Patent No. 302,701. It describes the use of LAS to formulate microemulsion of isothiazolone.

U.S. Patent No. 4,419,248 is a method for removing biofilms from a surface. It describes cooling the biofilm to below the freezing point of water to generate large, sharp-edged ice crystals in the biofilm. The frozen biofilm is then removed from the surface by, for instance, flowing a liquid across the surface. This disclosure is impractical to be applied to industrial water systems.

An approach of biofilm removal is given in the article, "Evaluation of Cleaning Strategies for Removal of Biofilms from Reverse-Osmosis Membranes" by C. Whittaker, H. Ridgway, and B. H. Olson in the August, 1984, issue of Applied and Environmental Microbiology, Vol. 48, No. 3 pages 395–403. Cleaning treatment for RO membrane using a combination of surfactants, biocides, and enzymes are discussed in this article. However, LAS is not included in the study.

Another article "Effects of surface-active chemicals on microbial adhesion" by W. K. Whitekettle in Journal of Industrial Microbiology, 1991, Vol. 7, pages 105–116, describes the use of surfactants, excluding LAS, to prevent microbial adhesion.

European Patent No. 590746 describes an optional application of using enzymes and/or surfactants to remove biofilm, but LAS is not mentioned in this disclosure.

SUMMARY OF THE INVENTION

The invention comprises a method for dispersing biofilms caused by the growth of slime-forming bacteria and other microorganisms in industrial process water. The method comprises adding an effective biofilm dispersing mount of a linear alkylbenzene sulfonate to the industrial process water which contains slime-forming bacteria and other biofilming microorganisms. In addition, an alternative embodiment of the invention comprises adding a compound selected from the group consisting of peracetic acid, glutaraldehyde, isothiazolone, methylene bisthiocyanate, thiocyanomethylthio benzothiazole, 2-bromo-2-nitro-1,3-propane diol, dibromonitrilopropane diol, tetrakis(hydroxymethyl) phosphonium sulfate, decylthioethane amine, alkyl dimethyl benzyl ammonium chloride and combinations thereof.

DESCRIPTION OF THE PREFERRED EMBODIMENT

The present invention takes advantage of the detergency and dispersancy properties of linear alkylbenzene sulfonate (LAS) and applies the compound as a biodispersant. It has been found that compounds of the formula:

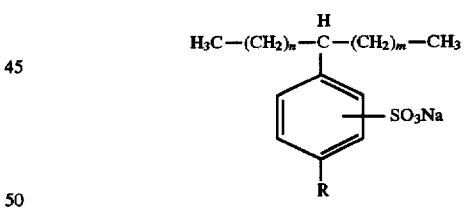

wherein n+m=7–10, preferably 9, and X=Na or K, preferably Na; R=hydrogen; alkyl or aryl, or combinations thereof, show good results on biofilm removal. Preferably, the linear alkylbenzene sulfonate of the invention is sodium dodecylbenzene sulfonate. The sodium dodecylbenzene sulfonate has a molecular weight of 348.5 grams. LAS is commercially available from various suppliers, including Stepan Co. of Northfield, Ill.

The LAS may be added to a submerged fouled water system to remove biofilms from the surfaces. In a preferred method the LAS is added to an industrial process water in an amount of from about 1.0 to about 50 parts per million (ppm). More preferably, the dosage is from abut 5 to about 20 ppm. Most preferably, the dosage is about 10 ppm.

The removal of biofilm is determined by changes in the protein content of the biofilms during treatment. The present invention has a superior performance on biofilm removal compared to other dispersants in the market. In addition, the biofilm removal can be accomplished without the addition of chemical biocides.

Previously, anionic biodispersants were predicted to be ineffective against bacterial biofilms because of repulsion between the negative center in the molecule and the negatively charged bacteria. Surprisingly, the anionic surfactant of the invention has shown superior performance against bacterial biofilms as compared to all other types of dispersants tested, which is indicated by the high ratios in biomass removal.

In an alternative embodiment the invention further comprises the addition of a biocide to the industrial process water, the biocide being selected from the group consisting of peracetic acid, glutaraldehyde, isothiazolone, methylene bisthiocyanate, thiocyanomethylthio benzothiazole, 2-bromo2-nitro-1, 3-propane diol, dibromonitrilopropane diol, tetralcishydroxy methyl phosphonium sulfate, decylthioethane amine, alkyl dimethyl benzyl ammonium chloride and combinations thereof. As shown in the Examples below LAS reacts synergistically with many commercially available biocides.

An advantage of the present invention is that it reduces the usage of expensive chemical biocides which are needed to control biofouling in water systems. In addition, the present invention provides a more cost effective and environmentally friendly (biodegradable) method of water treatment. Moreover, another advantage of the present invention is that it is compatible with corrosion and scale inhibitors used in industrial water treatment.

The invention has applications for numerous process waters such as industrial and/or commercial recirculating cooling water systems, air washer systems, brewery pasteurizers, and paper mills and is especially useful in the treatment of cooling waters.

EXAMPLES

The following examples illustrate the performance of biodispersancy obtained with the present invention.

The bacterial strain used to grow the biofilm was *Pseudomonas fluorescens*, which is a commonly found microorganism in industrial process water systems. The bioreactor used to grow bacterial biofilm was a continuous flow stiffed tank reactor. The bacterial biofilms were grown on glass and stainless steel surfaces for 72 hours at room temperature to reach steady state. The thickness of the biofilm was approximately 500 µm. The biofilms were then treated by continuously feeding with biodispersant for 24 hours in an attempt to remove biofilm from the substrata. The area density of the bacterial biofilms was measured by Coomassie Blue protein assay, and the biomass was expressed as µg protein per $cm^2$. The effectiveness of biofilm removal was determined by percent biomass loss on the surface during the treatment. A conventional plate counting technique was also employed to measure the viability of the bacterial population. The culture medium used to grow the biofilm bacteria was Tryptone Glucose Extract (TGE) agar. The cell density of the biofilm bacteria determined by TGE agar plate was expressed as colony forming unit (cfu) per $cm^2$.

The larger values of log reduction on bacterial viability were obtained only from biocide treatment. While the biocides did not cause significant removal on bacterial biomass, the present invention produced a much higher biofilm removal. Other dispersant type surfactants, such as EO/PO copolymer, were also used in the treatment to compare their performance with the present invention. The results show, during the 24 hour treatment time, superior biofilm removal was achieved by the composition of the present invention.

Example 1

Biomass (protein as $\mu g/cm^2$) removal activity of biodispersants against *Pseudomonas fluorescens* biofilm after 24 hour continuous treatment is shown in Table I below. The EO/PO copolymer used in this study was Pluronic®L61, which is a nonionic polyoxyethylene, polyoxypropylene block copolymer. The ethoxylated alkyl phenol type dispersant used for this study was Triton®X-165, which is a nonionic surfactant. Another type of dispersant used was a glucoside, such as Triton®BG-10, which is a nonionic surfactant. In addition, a terpene-based proprietary dispersant was used. The trade name for the product is Dispro MC 3000, also known as Talofin. Moreover, a commercial detergent concentrate, named PCC-54®, which claims to provide film-free surfaces, was applied in this study. Busperse®46 is a commercial biodispersant.

TABLE I

| Biodispersant (ppm as active ingredient) | % Biomass removal | Log reduction in viable biofilm bacteria |
| --- | --- | --- |
| LAS (1) | 46.2 ± 1.1 | 0.1 ± 0.0 |
| LAS (10) | 69.0 ± 2.8 | 0.5 ± 0.3 |
| EO/PO copolymer (10) | 0.9 ± 11.7 | 0.0 ± 0.3 |
| EO/PO copolymer (40) | 12.0 | 0.1 |
| Ethoxylated alkyl phenol (100) | 35.4 ± 10.4 | 0.5 ± 0.2 |
| Glucoside (100) | 0.0 ± 16.2 | 0.2 ± 0.3 |
| Terpene (40) | 0.00 ± 3.8 | 0.1 ± 0.1 |
| Terpene (1000) | 21.6 ± 10.3 | 1.3 ± 0.9 |
| PCC-54 ® (500) | 6.1 ± 10.9 | 0.9 ± 0.2 |
| PCC-54 ® (1000) | 47.6 ± 4.4 | 0.7 ± 0.4 |
| Busperse46 (20) | 0 | 0.1 |

Most of the dispersants tested did not express toxicity to the bacterial biofilms, which was indicated by the low values (less than one) of log reduction in $cfu/cm^2$. Among all the dispersants tests other than the present invention, PCC-54® showed good removal activity against bacterial biofilm at 1000 ppm, but the cost of using this chemical in water treatment is prohibitively expensive.

Example 2

Biomass (protein as $\mu g/cm^2$) removal activity of non-oxidizing biocides against *Pseudomonas fluorescens* biofilm after 24 hour continuous treatment is shown in Table II below. The chosen biocides were 2-(decylthio)ethaneamine, hydrochloride salt (DTEA), isothlazolone, glutaraldehyde and tetrakishydroxymethylphosphonium sulfate (THPS). Isothlazolone contains 1.15% of 5-chloro-2-methyl-4-isothiazolin-3-one and 0.35% 2-methyl-4-isothiazolin-3-one.

TABLE II

| Biocide (ppm a active ingredient) | % Biomass removal | Log reduction in viable biofilm bacteria |
| --- | --- | --- |
| DTEA (30) | 43.9 | 4.2 |
| Isothiazolone (3) | 3.2 | 3.6 |
| Isothiazolone (10) | 9.2 | 3.3 |
| Glutaraldehyde (45) | 0.0 | 3.0 |
| THPS (100) | 32.5 | 3.4 |

None of the biocides at chosen dosage was able to produce more than 50% removal of biofilm, although significant biocidal effects (3–4 logs reduction in viability) were achieved.

Example 3

The foaming profile of the biodispersant was determined by equilibrium dynamic foam heights in order to simulate the high turbulence in industrial cooling water systems. The upper limit of the device is 50 cm. Results are shown in Table III below.

TABLE III

| Biodispersant (ppm as active ingredient) | Equilibrium dynamic foam height (cm) |
|---|---|
| Control (cooling water) | 1 |
| LAS (1) | 3 |
| LAS (5) | 6 |
| LAS (10) | 10 |
| EO/PO copolymer (1) | 2 |
| EO/PO copolymer (10) | 3 |
| Terpene (40) | 20 |
| Terpene (1000) | >50 |
| PCC-54 ® (1000) | >50 |
| ªBARQUAT 4280Z (10) | 21 |
| ᵇMAQUAT MC1412 (10) | 30 |

ªBARQUAT 4280Z contains 40% n-alkyl dimethyl benzyl ammonium chloride, 40% n-alkyl enthylbenzyl ammonium chloride and 10% ethyl alcohol.
ᵇMAQUAT MC1412 contains 50% n-alkyl dimethyl benzyl ammonium chloride.

Both BARQUAT 4280Z and MAQUAT MC1412 are quaternary ammonium compounds (QACs), which have been known to cause significant foaming when applied in cooling water systems. EO/PO copolymer is a defoamer by itself. The present invention provided a more effective treatment with less foaming than the present state of the art (i.e., QACs).

Example 4

A compatibility test of the present invention with corrosion inhibitors was conducted with 4.5 ppm sodium tolytriazole, 20 ppm 2-phosphonobutane-1,2,4-tricarboxylic acid (PBTC) and 18 ppm of a terpolymer of acrylic acid/acrylamide/sulfomethylacrylamide. Results are shown in Table IV below. The water chemistry and alkalinity was controlled with 360 ppm CaCl$_2$, 200 ppm MgSO$_4$, and 220 ppm NaHCO$_3$. The pH was maintained within 8 to 9. The temperature was set at 43° C. (110° F.). The concentrations of LAS used for compatibility test were 20 and 50 mg/L respectively. The test was run for 40 hours, and the corrosion rate was determined by electrochemical parameters.

TABLE IV

| Chemicals | Reaction Time | Corrosion Rate (mpy) |
|---|---|---|
| Control | 5 h | 0.2 |
| LAS (20 ppm) | 5 h | 0.4 |
| LAS (50 ppm) | 5 h | 0.2 |
| Control | 10 h | 0.2 |
| LAS (20 ppm) | 10 h | 0.5 |
| LAS (50 ppm) | 10 h | 0.5 |
| Control | 25 h | 0.4 |
| LAS (20 ppm) | 25 h | 1.4 |
| LAS (50 ppm) | 25 h | 0.6 |
| Control | 40 h | 1.2 |
| LAS (20 ppm) | 40 h | 2.0 |
| LAS (50 ppm) | 40 h | 1.2 |

The compatibility test results indicate that the present invention does not aggravate corrosion control, which is indicated by the low corrosion rates (less than 5 mpy).

Example 5

A compatibility test between the present invention and scale inhibitors showed no significant effect on promoting scaling. Scale formation is determined by the Stir and Settle test, which was run at pH 9.0, 50° C. (122° F.). The scale inhibitors used in this study were chosen from among 1-hydroxyethylidene-1,1-diphosphonic acid (HEDP) and 2-phosphonobutane-1,2,4-tricarboxylic acid (PBTC). Results are shown in Table V below.

TABLE V

| ppm as CaCO$_3$ Ca$^{2+}$/HCO$_3^-$ | ppm, active HEDP | ppm, active PBTC | ppm, active LAS | Initial pH | Appearance 2 h | 2 h ppm as CaCO$_3$ soluble Ca$^{2+}$ | 2 h ppm as CaCO$_3$ ppt. | % Recovery soluble Ca$^{2+}$ |
|---|---|---|---|---|---|---|---|---|
| 300 | 5 | — | 10 | 7.89 | ppt | 160.31 | 139.49 | 53% |
| 300/300 | — | 10 | 10 | 7.88 | <ppt | 190.06 | 109.94 | 63% |
| 300/300 | 5 | — | — | 7.91 | <<ppt | 246.69 | 53.31 | 82% |
| 300/300 | — | 10 | — | 7.93 | clear | 300.19 | — | 100% |
| 400 | 5 | — | 10 | 7.91 | ppt | 186.44 | 213.56 | 47% |
| 400/400 | — | 10 | 10 | 7.93 | ppt | 298.94 | 101.06 | 75% |
| 400/400 | 5 | — | — | 8.01 | ppt | 144.13 | 255.87 | 36% |
| 400/400 | — | 10 | — | 8.01 | <ppt | 161.69 | 238.31 | 40% |
| 500 | 5 | — | 10 | 7.95 | ppt | 155.75 | 344.25 | 31% |
| 500/500 | — | 10 | 10 | 7.97 | ppt | 175.92 | 324.08 | 35% |
| 500/500 | 5 | — | — | 8.00 | ppt | 152.67 | 347.33 | 31% |
| 500/500 | — | 10 | — | 8.00 | ppt | 176.75 | 323.25 | 35% |
| 600 | 5 | — | 10 | 7.93 | ppt | 120.92 | 479.08 | 20% |
| 600/600 | — | 10 | 10 | 7.92 | ppt | 163.08 | 436.92 | 27% |
| 600/600 | 5 | — | — | 7.98 | ppt | 156.08 | 443.92 | 26% |
| 600/600 | — | 10 | — | 8.04 | ppt | 177.17 | 422.83 | 30% |

The scale formation, indicated by the low percent recovery of soluble Ca$^{2+}$, was slightly higher at 300 ppm CaCO$_3$ or Ca$^{2+}$/HCO$_3^-$ with LAS in the system. The difference on scale formation diminished when the concentration was raised to 400 ppm or higher. Overall, there was no significant difference on the scale formation either with or without the present invention at 10 ppm level.

Example 6

Synergism between LAS and several commercially available biocides was determined by the method of calculation described by F. C. Kull, P. C. Eisman, H. D. Sylwestrowicz and R. L. Mayer, Applied Microbiology, vol. 9, pages 538–541, (1961) using the relationship:

$$\frac{QA}{Qa} + \frac{QB}{Qb} = \text{synergism index } (SI)$$

where:

Qa=quantity of LAS, acting alone, producing an end point.
Qb=quantity of biocide, acting alone, producing an end point.
QA=quantity of LAS in mixture, producing an end point.
QB=quantity of biocide in mixture, producing an end point.

| If Synergy Index (SI) is | < 1, it indicates synergy |
| --- | --- |
| | = 1, it indicates additivity |
| | > 1, it indicates antagonism |

TABLE VI

LAS and Isothiazolone

| LAS (ppm) | Isothiazolone (ppm) | SI |
| --- | --- | --- |
| 1000 | 0.1 | 0.55 |
| 2000 | 0.1 | 0.6 |
| 5000 | 0.1 | 0.75 |
| 1000 | 0.075 | 0.79 |
| 2500 | 0.075 | 0.85 |

TABLE VII

LAS and Peracetic Acid (PAA)

| LAS (ppm) | PAA (ppm) | SI |
| --- | --- | --- |
| 100 | 0.5 | 0.9 |

TABLE VII

LAS and Glutaraldehyde

| LAS (ppm) | Glutaraldehyde (ppm) | SI |
| --- | --- | --- |
| 100 | 1 | 0.9 |

Changes can be made in the composition, operation and arrangement of the method of the present invention described herein without departing from the concept and scope of the invention as defined in the following claims:

We claim:

1. A method for dispersing biofilms on surfaces of an industrial process water system, said biofilms caused by the growth of bacteria and other microorganisms in industrial process water containing slime-forming bacteria and other biofilm-forming microorganisms which comprises treating the water with an effective biofilm dispersing amount of linear alkylbenzene sulfonate, having the formula

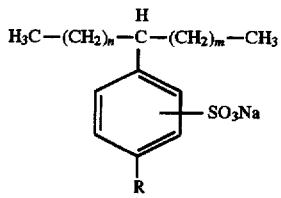

wherein n+m=7–10, and X=Na or K.; R=hydrogen, alkyl or aryl, or combinations thereof.

2. The method of claim 1 wherein the industrial process water is cooling water.

3. The method of claim 1, wherein the linear alkylbenzene sulfonate is sodium dodecylbenzene sulfonate.

4. The method of claim 1, further comprising adding a compound selected from the group consisting of peracetic acid, glutaraldehyde, isothiazolone, methylene bis thiocyanate, thiocyanomethylthio benzothiazole, 2-bromo-2-nitro-1,3-propane diol, alkyl dimethyl benzyl ammonium chloride and combinations thereof.

5. The method of claim 1, further comprising adding a compound selected from the group consisting of tolytriazole, 2-phosphonobutane-1,2,4-tricarboxylic acid and acrylic acid/acrylamide/sulfomethylacrylamide terpolymer.

6. The method of claim 1, further comprising adding a compound selected from the group consisting of 1-hydroxyethylidene-1,1-diphosphonic acid and 2-phosphonobutane-1,2,4-tricarboxylic acid.

7. The method of claim 1, wherein the linear alkylbenzene sulfonate is added to the industrial process water in an amount of from about 1.0 to about 50 parts per million.

8. The method of claim 7, wherein the linear alkylbenzene sulfonate is added to the industrial process water in an amount of from about 5 to about 20 parts per million.

9. The method of claim 7, wherein the linear alkylbenzene sulfonate is added to the industrial process water in an amount of from about 8 to about 10 parts per million.

* * * * *